United States Patent [19]

Davidts

[11] Patent Number: 4,825,996
[45] Date of Patent: May 2, 1989

[54] SCRAPER ASSEMBLY FOR SCRAPING A SURFACE OF A CONVEYING BELT

[75] Inventor: Emmanuel Davidts, Ecaussines, Belgium

[73] Assignee: Technic Gum, Soignies, Belgium

[21] Appl. No.: 70,245

[22] Filed: Jul. 6, 1987

[30] Foreign Application Priority Data

Jul. 9, 1986 [BE] Belgium .............................. 0/216902

[51] Int. Cl.$^4$ ............................................. B65G 45/00
[52] U.S. Cl. ..................... 198/497; 15/256.5
[58] Field of Search ............... 198/497, 499; 15/256.5, 15/256.51–256.53, 256.6

[56] References Cited

U.S. PATENT DOCUMENTS

| | | | |
|---|---|---|---|
| 3,656,610 | 4/1972 | McWilliams | 198/497 |
| 3,841,470 | 10/1974 | Meguro | 198/499 |
| 4,131,194 | 12/1978 | Anderson | 198/499 X |
| 4,202,437 | 5/1980 | Gordon | 198/497 |
| 4,249,650 | 2/1981 | Stahura | 198/499 |
| 4,344,525 | 8/1982 | Bancroft et al. | 198/497 X |
| 4,533,036 | 8/1985 | Gordon | 198/499 |
| 4,541,523 | 9/1985 | Stockton | 198/499 |
| 4,643,293 | 2/1987 | Swinderman | 198/497 |
| 4,664,250 | 5/1987 | Jakobs | 198/499 |

FOREIGN PATENT DOCUMENTS

| | | |
|---|---|---|
| 895740 | 5/1983 | Belgium . |
| 900862 | 2/1985 | Belgium . |
| 2318497 | 10/1978 | Fed. Rep. of Germany . |
| 1127925 | 8/1956 | France . |
| 2165809 | 4/1986 | United Kingdom ................ 198/499 |

Primary Examiner—Frank E. Werner
Assistant Examiner—D. Glenn Dayoan
Attorney, Agent, or Firm—Watson, Cole, Grindle & Watson

[57] ABSTRACT

A scraper assembly includes a scraper comprising a blade and a damping element to which the blade is fastened, the damping element including a recess, and a base element which has at least a portion that can fit within the recess so as to support the damping element and thus position the scraper in operating position.

6 Claims, 3 Drawing Sheets

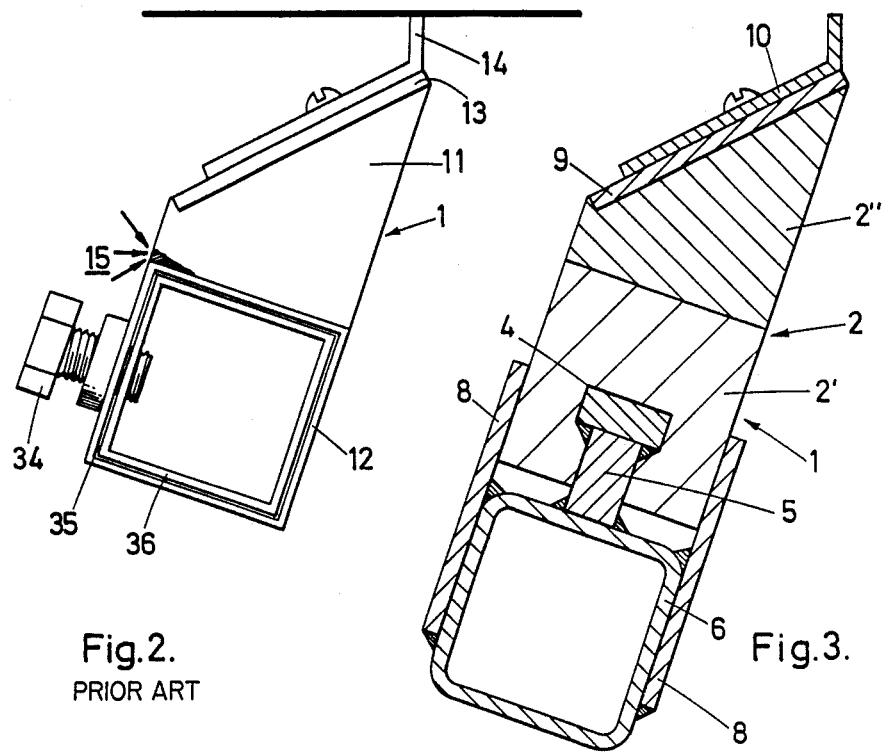
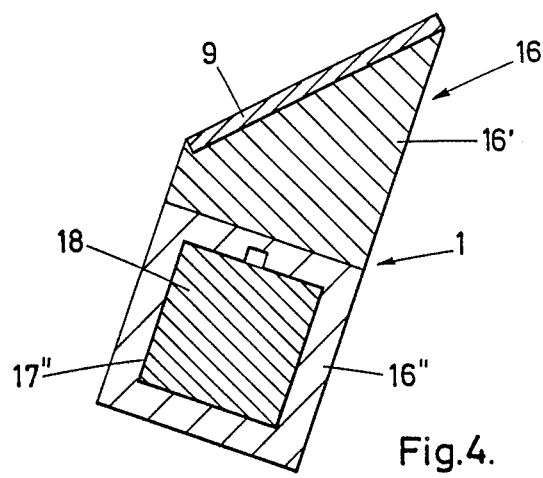
Fig.2. PRIOR ART
Fig.3.
Fig.4.

SCRAPER ASSEMBLY FOR SCRAPING A SURFACE OF A CONVEYING BELT

BACKGROUND OF THE INVENTION

1. Field of the Invention

This invention relates to a scraping assembly for scraping a conveying belt and which uses a scraper comprised of a blade and a damping support to which the blade is secured.

2. The Prior Art

It has already been proposed to arrange a scraping blade on rubber material in such a way as to obtain damping of the vibrations caused by the scraping operation and to achieve an improved resilient pressure of the scraping blade on the side of the conveying belt it is desired to scrape or clean.

Such attempts have already been described in U.S. Pat. No. 3,656,610, in French Pat. No. 1,127,925, and in German Pat. No. 23 18 497.

However, a plurality of disadvantages and deficiencies characterize the scraper assemblies according to the noted French and German Patents. In this regard, the scraper assembly disclosed in the French Patent does not provide sufficient scraping force, even though the principle of sandwiching a rubber damper between a scraper support and the blade was at the time a substantial improvement.

Assembly for the scraper as disclosed in the noted German Patent displays a so-called blade chattering when the damper works in compression. When in variations according to the Patent the damper works in shear and in compression, the rubber element tears prematurely, which naturally causes a heavy, inadmissible waste.

In the present applicant's prior scraping assembly as disclosed Belgian Pat. Nos. 895,740 and 900,862, there has been noticed a shear stress which is very unfavourable and causes a tearing rate which is much too high.

The object of the invention thus lies in obviating such drawbacks and in providing a scraping assembly for a conveying belt with a new and original design, as well as the scraper being used in such an assembly.

SUMMARY OF THE INVENTION

To achieve the object according to the invention, the scraper damping support according to the invention has at least one recess wherewith the support can be slipped over at least one base element.

In a particularly adavantageous embodiment of the invention, the recess communicates with at least one side of the damper, while a sectional shape with a cross-section which corresponds to the recess is secured to or is integral with a hollow support to be slipped over a base element which may in turn be fastened to the assembly framework.

In a noteworthy embodiment of the invention, the cross-section is a T-shape and the support which comprises at least one sectional shape over which the damper may be slipped is provided sidewise with two clamping cheeks, enabling the damper to be locked in position by wedging between the cheeks.

Other details and features of the invention will stand out from the following description, given by way of non-limitative example and with reference to the accompanying drawings.

BRIEF DESCRIPTION OF THE DRAWINGS

FIG. 2 shows a prior art scraper being subjected to a compression and shear action.

FIG. 3 is a cross-section through a scraper according to the invention.

FIG. 4 also shows a cross-section through a variation of the scraper according to the invention.

DETAILED DESCRIPTION OF THE PREFERRED EMBODIMENTS

The assembly according to the invention has for an essential feature a new and original scraper, as shown in 1 in the figures.

The scraper comprises a damping element (damper) 2 made from a flexible material, which can insure on the one hand an accurate retaining of the damping element in position on a support, and on the other hand a suitable resiliency of the scraper withstanding essentially shear stresses.

Figure 1:
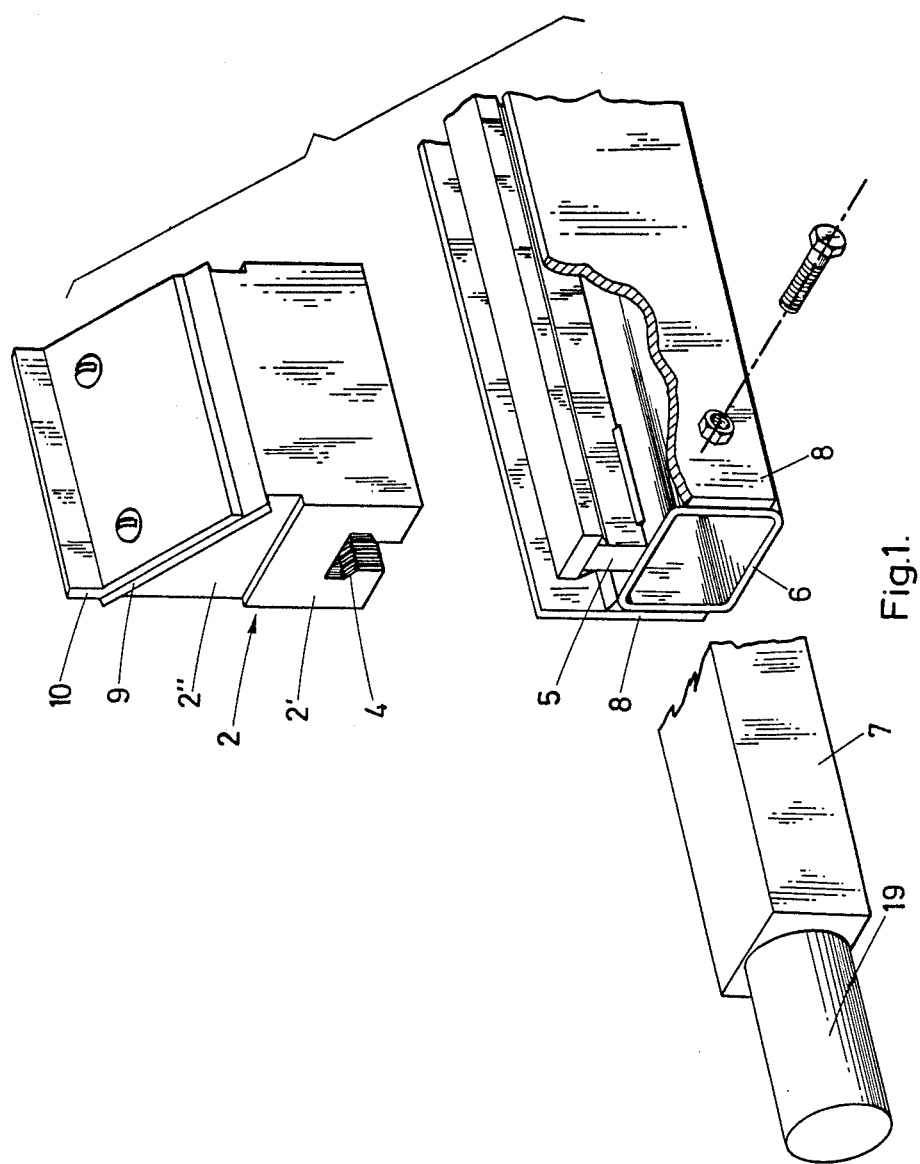
FIG. 1 shows as an exploded view, with parts broken away, of the base element whereon the hollow support may be slipped, which bears a sectional shape whereon the damper from the scraper itself may be slipped.

The damper 2 comprises in the embodiment as shown in FIG. 3, a recess 4 whose cross-section, for example, is T-shaped, and matches the cross-section of a sectional shape 5 which is secured to or is part of a hollow support 6. In this same embodiment, the hollow support 6 is intended to be slipped over a base element 7 (FIG. 1).

Moreover, two clamping cheeks 8 have been welded sidewise to the hollow support 6 these cheeks enabling the to be wedged and locked into damper 2 on sectional shape 5.

At the top thereof, the damper 2 bears a plate 9 joined thereto by vulcanizing, and the scraper blade 10 is fastened on the plate.

The damper 2 is comprised, in a preferred embodiment of the invention, of two resilient materials having different "shore" values. The portion 2' from damper 2 then has a "shore" value corresponding to a higher hardness, while the portion 2" has a "shore" value corresponding to more flexibility to play essentially the part of a damper.

Due to such a structure, the mechanical tensile and compression stresses as well as the shear stresses are progressively distributed and the forces resulting therefrom are coupled to the cheeks 8 which enclose the damper base and to the sectional shape 5.

By substituting for the prior art metal-rubber combination, a one-part damper with two components, there is avoided a sudden cut-off of the resilient motions level with the joint between the rubber and metal, as shown in FIG. 2 where the rubber damper 11 is joined by vulcanizing on the one hand with a steel tube 12 and on the other hand with a support plate 13 for the blade 14. That area shown with three arrows 15 is the location where the shear results are rapidly observed.

It is also clear that the damper 2 from the scraper is easily mounted on the sectional shape 5 and lies after a slight movement of cheeks 8 inwardly relative to the unit, firmly squeezed on hollow support 6.

All the deficiencies of those scrapers wherein the rubber damping support is joined along the base thereof with a metal element are thus avoided.

In an embodiment based on the same principle, the damper 16 (FIG. 4) comprised of two parts 16' and 16" with the same characteristics of different "shore" hardness, or with a single "shore" hardness, has in the part 16" thereof, a square recess 17"', in such a d way that damper 16 may be slipped and secured in position on a support 18 having a corresponding cross-section.

In this variation, a solution is given to the corrosion problems which are very substantial in the chemical industry, where the corroding vapours or the characteristics of those products being conveyed are very dangerous for any metal structure in a conveying belt equipment.

Both embodiments as described hereinabove avoid arranging mechanical clamping elements 34 for connecting the elements together, so as to dispense with the play 35 which is present between tube 12 and sectional shape 36 it is slipped into. Such a mounting causes vibrations.

Figure 5:
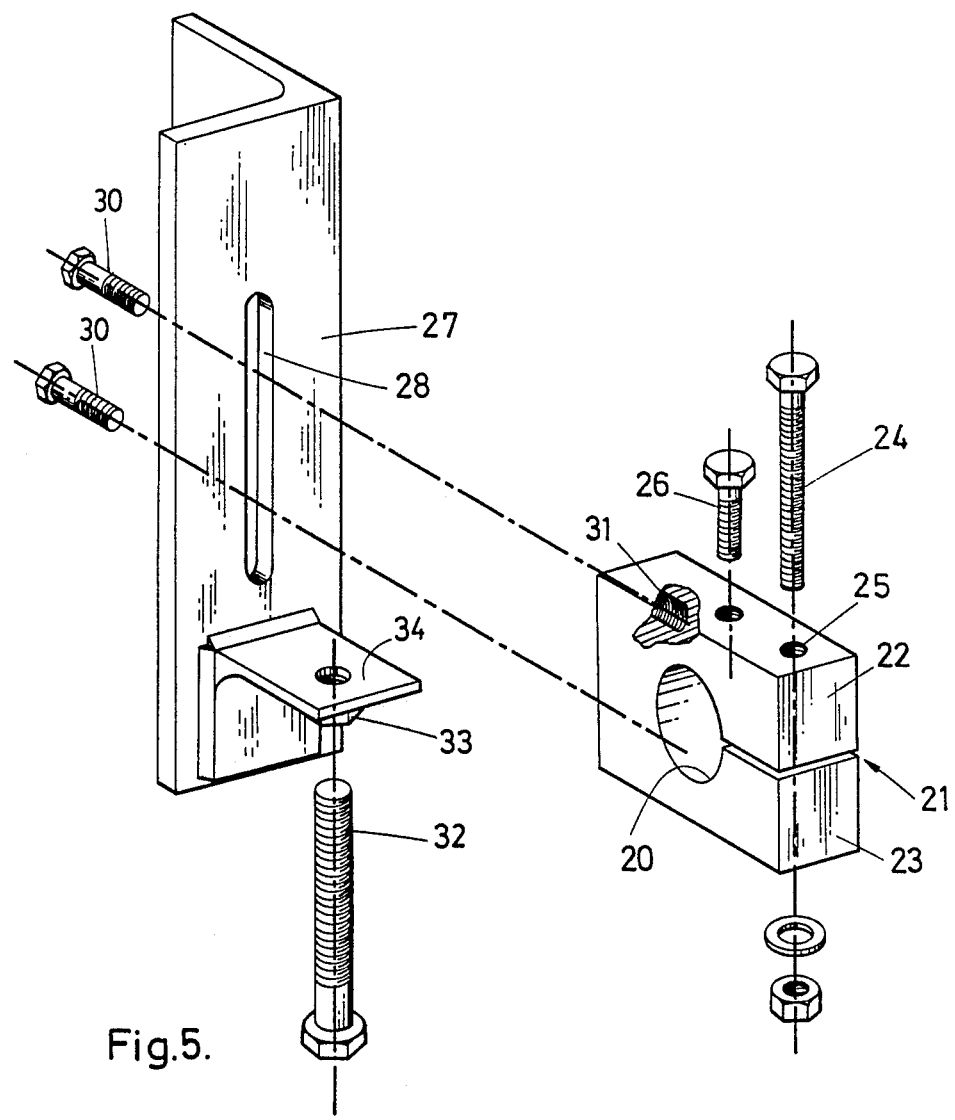
FIG. 5 shows an exploded view of the mounting and fastening members which are part of the apparatus according to the invention.

Finally with reference to FIGS. 1 and 5, it will be noticed that the square-section base element 7 ends in cylinder-shaped ends 19 which can be clamped in the opening 20 from a clamping block 21 comprising jaws 22 and 23 which are movable closer together by tightening a screw-bolt 24 which goes through a screw-threaded opening 25 in the clamping block 20. The locking proper, in the desired angular position of hollow support 7 occurs by tightening the screw-bolt 26 which enters a screw-threaded hole which opens into the opening 20 which is to receive the cylinder-shaped end 19.

The clamping block 21 adjusts in height on an angle-iron 27, into a slot 28, wherethrough two fastening screw-bolts 30 can pass, which enter one-ended holes 31 in the clamping block. Once the height of clamping block 21 has been determined relative to angle-iron 27, the clamping block 21 may be fixed in position by screwing-down the screw-bolt 34 passing through a nut 33 secured to an angle-iron 32 which is welded in turn on angle-rion 27. It must be understood that the invention is in no way limited to the above-described embodiments and that many changes may be brought thereto without departing from the scope of the invention as defined in the appended claims.

What is claimed is:

1. A scraper assembly for scraping a surface of a moving conveyor belt, said scraper assembly comprising a support element which includes a metallic beam having an upper surface and opposite side surfaces, separate cheeks which respectively extend upwardly from said opposite side surfaces of said beam, and a projection having a certain size and cross sectional shape which extends upwardly from said upper surface of said beam, and a scraper element which is mountable on said support element, said scraper element including a damper having an upper portion form an upper surface, a lower portion forming a lower surface, and a recess in said lower portion, said lower portion being sized so as to wedge between said cheeks of said support element and said recess being sized and shaped to cooperate with said projection such that when said damper is wedged between said cheeks, said projection will simultaneously fit within said recess, thereby reducing the possibility of shear tearing occurring between the damper and the support element, a plate attached by vulcanization to said upper surface of said upper portion, and a scraper blade removably mounted on said plate.

2. A scraper assembly according to claim 1, wherein said recess in the lower portion of said damper communicates with said lower surface thereof and has a T-shaped cross section, and wherein said projection has a T-shaped cross section.

3. A scraper assembly according to claim 1, wherein the upper portion of said scraper element is composed of a first material, wherein the lower portion of said scraper element is composed of a second material, and wherein said first material has a higher flexibility than said second material.

4. A scraper assembly according to claim 1, wherein said recess is contained entirely within the lower portion of said damper and wherein said support element extends within said recess.

5. A scraper assembly according to claim 4, wherein said recess has a first portion with a square cross section and a second portion with a square cross section, said second portion having a smaller cross section than said first portion, and wherein said support element comprises a beam having a rectangular cross section and a projection with a square cross section extending away from said beam, said beam fitting with the first portion of said recess and said projecting fitting with the second portion of said recess.

6. A scraper assembly according to claim 5, wherein the upper portion of said scraper element is composed of a first material, wherein the lower portion of said scraper element is composed of a second material, and wherein said first material has a higher flexibility than said second material.

* * * * *